US012790004B2

(12) United States Patent
Thangavel et al.

(10) Patent No.: US 12,790,004 B2
(45) Date of Patent: Nov. 10, 2026

(54) AIR DATA SENSOR STRUT ICE PROTECTION

(71) Applicant: Rosemount Aerospace Inc., Burnsville, MN (US)

(72) Inventors: Sathish Thangavel, Bangalore (IN); Paul R. Johnson, Prior Lake, MN (US); Shivanshu Bajpai, Bangalore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 423 days.

(21) Appl. No.: 18/383,539

(22) Filed: Oct. 25, 2023

(65) Prior Publication Data

US 2024/0327005 A1 Oct. 3, 2024

(30) Foreign Application Priority Data

Mar. 28, 2023 (IN) ............................. 202341022883

(51) Int. Cl.
*G01P 5/00* (2006.01)
*B64D 15/12* (2006.01)
*B64D 15/20* (2006.01)
*G01P 5/165* (2006.01)

(52) U.S. Cl.
CPC ............. *B64D 15/12* (2013.01); *B64D 15/20* (2013.01); *G01P 5/165* (2013.01)

(58) Field of Classification Search
CPC .......... G01P 5/165; B64D 15/20; B64D 15/12
See application file for complete search history.

(56) References Cited

U.S. PATENT DOCUMENTS 10,132,824 B2 11/2018 Benning et al.
10,197,588 B2 2/2019 Wong et al.
11,237,031 B2 2/2022 Wigen et al.
2014/0050247 A1* 2/2014 Herman ............... G01K 13/028 374/138
2017/0370960 A1* 12/2017 Benning ................ B64D 15/20
2019/0383848 A1 12/2019 Matheis et al.

FOREIGN PATENT DOCUMENTS

CA 2747268 A1 * 6/2010 ............. B64D 15/20
CN 215591010 U * 1/2022
EP 0274758 A2 7/1988
EP 4304938 B1 * 10/2024 ............. B64D 33/02
IT 202100005525 A1 * 9/2022 ............. B64D 33/02
RU 2152042 C1 * 6/2000 ............ G01P 13/025

OTHER PUBLICATIONS

European Patent Office, Extended European Search Report received in EP Application No. 24167346.6, Jul. 31, 2024, 6 pages.

* cited by examiner

*Primary Examiner* — Jamel E Williams
(74) *Attorney, Agent, or Firm* — Suiter Swantz IP

(57) ABSTRACT

A method of ice protection includes performing anti-icing on a forward portion of an air data sensor for a first duration while maintaining de-icing on an aft portion of the air data probe in a deactivated state. The method includes activating de-icing on the aft portion of the air data probe for a second duration while also performing anti-icing on the forward portion of the air data sensor.

15 Claims, 3 Drawing Sheets

AIR DATA SENSOR STRUT ICE PROTECTION

CROSS REFERENCE TO RELATED APPLICATIONS

This application claims priority to Indian Patent Application No. IN 202341022883, filed Mar. 28, 2023. The entire contents of this application are incorporated herein by reference in their entirety.

BACKGROUND

1. Field

The present disclosure relates to air data probes and sensors, and more particularly to ice protection for air data sensors on aircraft.

2. Description of Related Art

In aircraft, an icing component typically uses either an anti-icing or a de-icing system, depending upon the criticality of the part. Anti-icing systems keep a part ice free, e.g. for an entire flight. De-icing, on the other hand, removes the ice once it accretes on the part. Anti-icing systems are continuously powered during a flight whereas de-icing systems are activated only if the aircraft encounters inflight icing conditions. Examples of aircraft components that utilize anti-icing are piccolo tube heating for wing leading edges and air data probes, which are traditionally anti-iced by Joule heating using electric heaters. The pneumatic boots used at wing leading edges for propeller driven aircraft are an example of a de-ice application.

Air data probes are relatively high on the scale of critical comments for an aircraft to fly safely and they should be fully functional under icing conditions. So, typical air data probes use anti-icing system to avoid ice accretion on the more critical probe surfaces. The unprotected less critical probe surfaces such as aft struts can nonetheless accrete ice during inflight icing despite the anti-icing on the more critical probe surfaces. Severe ice growth on the unprotected probe surfaces, if allowed to continue long enough, e.g. on a flight long enough through airspace with icing conditions, can affect the aerodynamics which can eventually degrade the probe performance. One solution is to extending the anti-icing system to the aft strut to avoid the ice accretion while in flight, e.g. to maintain proper air data probe function for longer flights through icing conditions. This extra anti-icing increases the probe total power consumption in the flight cycle. Therefore, significant flight hours and multiple probes on a commercial aircraft collectively increase the engine fuel consumption to generate the additional anti-icing power required, or in electric/hybrid aircraft, the battery range will be reduced.

The conventional techniques have been considered satisfactory for their intended purpose. However, there is an ever present need for improved systems and methods for ice protection for air data sensors. This disclosure provides a solution for this need.

SUMMARY

A method of ice protection includes performing anti-icing on a forward portion of an air data sensor for a first duration while maintaining de-icing on an aft portion of the air data probe in a deactivated state. The method includes activating de-icing on the aft portion of the air data probe for a second duration while also performing anti-icing on the forward portion of the air data sensor.

Maintaining de-icing in the deactivated state for the first duration can include allowing ice accretion on the aft portion of the air data probe during the first duration. Activating de-icing for the second duration can include removing the ice accretion from the aft portion of the air data probe. The method can include repeatedly switching between performing anti-icing without de-icing and performing anti-icing while de-icing during a flight mission.

Performing anti-icing can include activating an anti-icing heating element situated in the forward portion of the air data sensor. Activating de-icing can include activating a de-icing heating element situated in the aft portion of the air data sensor. The forward portion and the aft portion can be mutually exclusive portions of the air data sensor. The de-icing heating element can be arranged in an aft portion of a strut of the air data sensor. The anti-icing heating element can be arranged in a leading edge portion of the strut. The anti-icing heating element can also be arranged in a pitot probe extending forward from the strut.

The method can include detecting icing conditions, wherein activating de-icing for the second duration is performed in response to detecting the icing conditions. Detecting icing conditions can include receiving temperature data from at least one temperature sensor of the air data sensor indicative of a temperature drop. Detecting icing conditions can include receiving electrical current data from an anti-icing heating element of the air temperature sensor indicative of a temperature drop. Detecting icing conditions can include receiving ice detection data from at least one dedicated ice detector aboard an aircraft that is separate from the air data sensor indicative of icing conditions. The method can include detecting cessation of the icing conditions, and deactivating de-icing for a third duration after the second duration in response to detecting the cessation of the icing conditions, while continuing to perform anti-icing during the third duration.

A system can include an air data sensor. The air data sensor can include a controller and machine readable instructions configured to cause the controller to perform a method of ice protection as described above on the air data sensor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
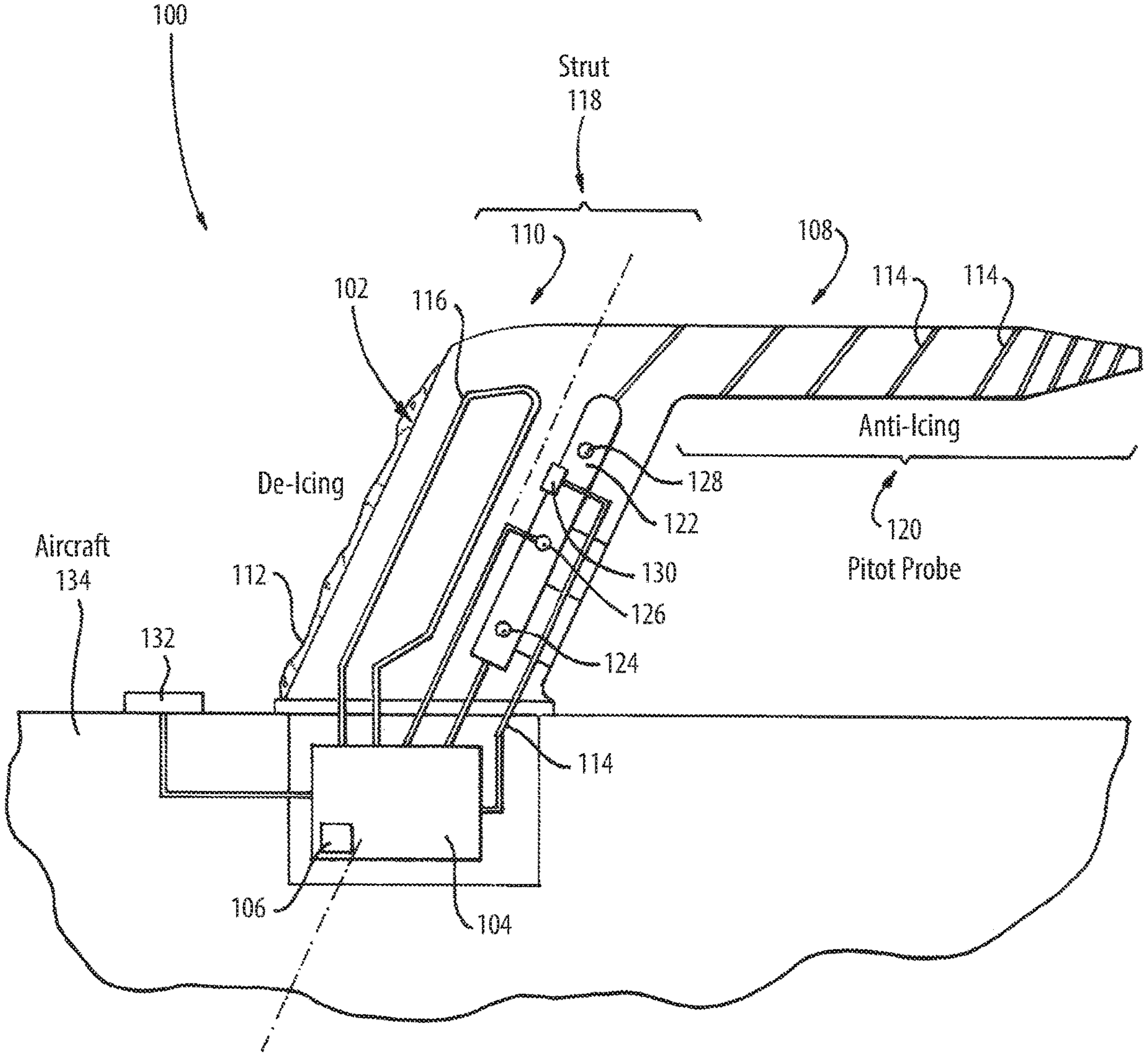
FIG. 1 is a schematic view of an embodiment of a an air data sensor system constructed in accordance with the present disclosure, showing the separate forward and aft heating elements.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to activate and deactivate de-icing for a portion of an air data probe conserve energy while also full time protecting another portion of the air data probe with anti-icing.

The system 100 includes an air data sensor 102 including a controller 104 and machine readable instructions 106 configured to cause the controller 104 to perform a method of ice protection as described below on the air data sensor 102. The machine readable instructions 106 can be digital, e.g. stored in a computer memory, or can be in the form of dedicated analog or digital logic circuit components or any other suitable form of machine readable instructions.

A method of ice protection includes performing anti-icing on a forward portion 108 of the air data sensor 102 for a first duration while maintaining de-icing on an aft portion 110 of the air data probe 102 in a deactivated state. The method includes activating de-icing on the aft portion 110 of the air data probe 102 for a second duration while also performing anti-icing on the forward portion 108 of the air data sensor 102. During a mission, the anti-icing in the forward portion 108 remains powered on full time, whereas the de-icing turns on and off as needed in the aft portion 110.

Maintaining de-icing in the deactivated state for the first duration includes allowing ice accretion 112 to form on the aft portion 102 of the air data probe during the first duration. Activating de-icing for the second duration includes removing the ice accretion 112 from the aft portion 110 of the air data probe 102. The method includes repeatedly switching as needed between performing anti-icing without de-icing and performing anti-icing while de-icing during a flight mission.

Performing anti-icing includes activating an anti-icing heating element 114 situated in the forward portion 108 of the air data sensor 102. Activating de-icing includes activating a de-icing heating element 116 situated in the aft portion 110 of the air data sensor 102. The forward portion 108 and the aft portion 110 are mutually exclusive portions of the air data sensor 102, e.g. separated by the dashed line in FIG. 1, however the boundary between the forward and aft portions 108, 110 can be convoluted without departing from the scope of this disclosure. The de-icing heating element 116 is arranged in an aft portion of the strut 118 of the air data sensor 102. The anti-icing heating element 108 is arranged in a leading edge portion 122 of the strut 118 and in the pitot probe 120 extending forward from the strut 118.

Figure 2:
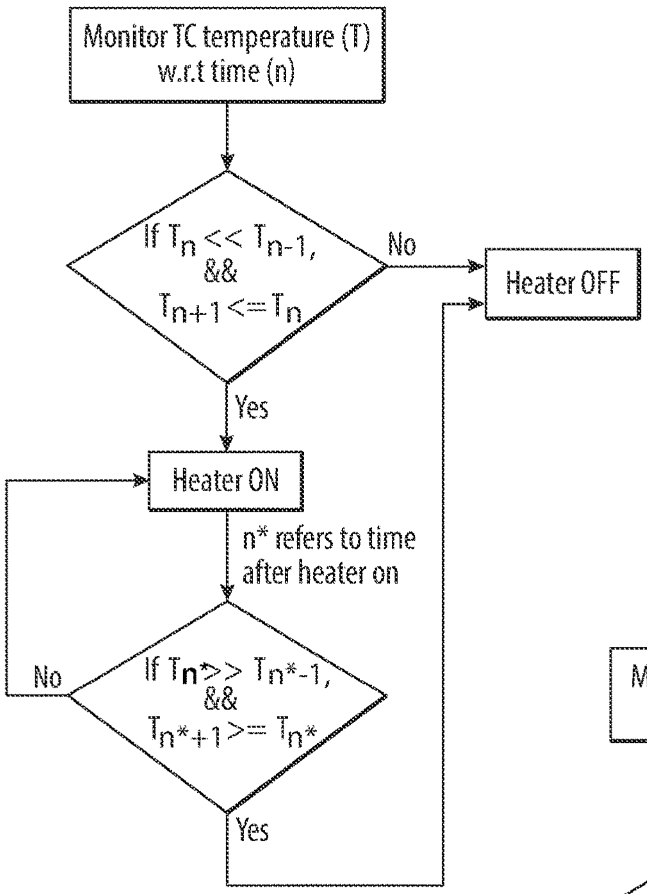
FIG. 2 is a logic flow diagram of a temperature sensor based control scheme for the aft heating element of FIG. 1.
Figure 3:
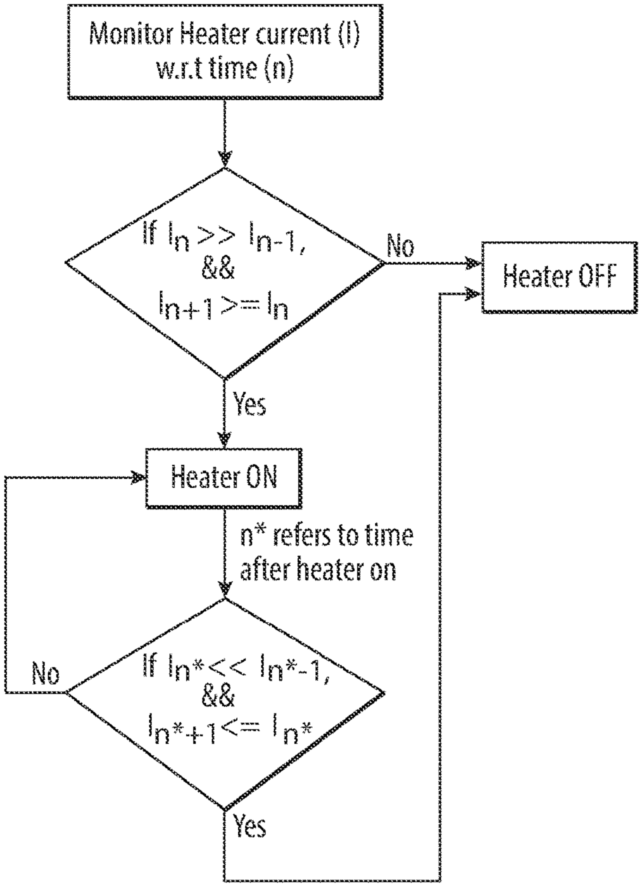
FIG. 3 is a logic flow diagram of an electrical current based control scheme for the aft heating element of FIG. 1.
Figure 4:
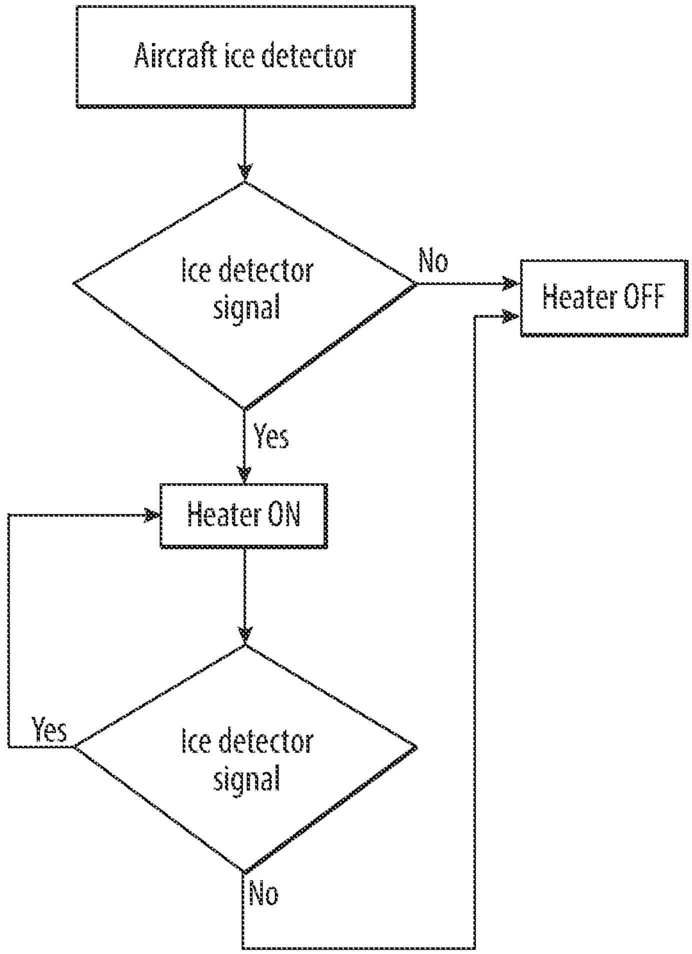
FIG. 4 is a logic flow diagram of a dedicated ice detection based control scheme for the aft heating element of FIG. 1.

The method includes detecting icing conditions, wherein activating de-icing for the second duration is performed in response to detecting the icing conditions. The method includes detecting cessation of the icing conditions, and deactivating de-icing for a third duration after the second duration in response to detecting the cessation of the icing conditions, while continuing to perform anti-icing during the third duration. FIGS. 2-4 show three different logic schemes that can be used for the controller 104 to activate and deactivate the deicing heating element 116.

With reference to FIGS. 1 and 2 together, detecting icing conditions includes receiving temperature data from at least one temperature sensor 124, 126, 128 of the air data sensor 102 indicative of a temperature drop. FIG. 2 shows logic the controller 104 of FIG. 1 can use for this technique of detecting icing conditions. While monitoring the temperature data from the at least one temperature sensor 124, 126, 128 if there is a large temperature drop indicated in the data ($T_n \ll T_{n-1}$) and if the temperature is not rising ($T_{n+1} <= T_n$) then the de-icing heating element 116 is activated and remains activated because the large temperature drop is indicative of the presence of super cooled droplets. The de-icing heater element 116 can be deactivated upon a large rise in the temperature data ($T_n^* >> T_{n^*-1}$) indicative of cessation of presence of super cooled droplets, and if the temperature data is not showing a drop in temperature ($T_{n^*+1} >= T_{n^*}$).

With reference now to FIGS. 1 and 3 together, detecting icing conditions can include the controller 104 receiving electrical current data, e.g. from a current sensor 130 connected to detect electrical current in the anti-icing heating element 114 of the air temperature sensor 102. A sudden rise in the electrical current drawn in the anti-icing heating element 114 is indicative of a temperature drop due to impingement of super cooled droplets onto the air data sensor 102. While monitoring the electrical current data from the at sensor 130, if there is a large temperature drop indicated in the electrical current data ($I_n >> I_{n-1}$) and if the temperature is not rising ($I_{n+1} >= I_n$) then the controller 104 activates the de-icing heating element 116 keeps it activated because the large temperature drop is indicative of the presence of super cooled droplets. The controller 104 can deactivate the de-icing heater element 116 upon a large drop in the electrical current data ($I_{n^*} << I_{n+-1}$) indicative of cessation of presence of super cooled droplets, and if the electrical current data is not showing a drop in temperature ($I_{n^*+1} <= I_{n^*}$).

Referring now to FIGS. 1 and 4 together, the controller 104 detecting icing conditions can include receiving ice detection data indicative of icing conditions from at least one dedicated ice detector 132 aboard the aircraft 132, wherein both the air data sensor 102 and the separate dedicate ice detector 132 are aboard the aircraft 132. The controller 104 can keep the de-icing heating element 116 activated as long as there is no indication in the ice detection data that the icing conditions have ceased. The controller 104 can deactivate the de-icing can be deactivated upon receipt of ice detection data from the dedicated ice detector 132 indicative of cessation of presence of super cooled droplets.

Systems and methods as disclosed herein can provide various potential benefits including the following. Compared to traditional ice protection techniques, systems and methods as disclose herein have less power consumption in a flight cycle which reduces the fuel consumption and/or battery drain. The future air transport includes hybrid and/or fully electric aircraft. The systems and methods disclose herein can create a path to even use of a fully heated air data probe in an electric aircraft were power for heating is a major concern. Using an aft de-icing heater, useful lifetime increases significant compared to traditional systems due to the ability for reduced duty of operation during flight The methods and systems of the present disclosure, as described above and shown in the drawings, provide for selectively de-icing a portion of an air data probe conserve energy while also full time protecting another portion of the air data probe with anti-icing. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of ice protection comprising:

performing anti-icing on a forward portion of an air data sensor for a first duration while maintaining de-icing on an aft portion of the air data sensor in a deactivated state; and activating de-icing on the aft portion of the air data sensor for a second duration while also performing anti-icing on the forward portion of the air data sensor.

2. The method as recited in claim 1, wherein maintaining de-icing in the deactivated state for the first duration includes allowing ice accretion on the aft portion of the air data sensor during the first duration.

3. The method as recited in claim 2, wherein activating de-icing for the second duration includes removing the ice accretion from the aft portion of the air data sensor.

4. The method as recited in claim 1, further comprising repeatedly switching between performing anti-icing without de-icing and performing anti-icing while de-icing during a flight mission.

5. The method as recited in claim 1, wherein performing anti-icing includes activating an anti-icing heating element situated in the forward portion of the air data sensor, and wherein activating de-icing includes activating a de-icing heating element situated in the aft portion of the air data sensor.

6. The method as recited in claim 5, wherein the forward portion and the aft portion are mutually exclusive portions of the air data sensor.

7. The method as recited in claim 6, wherein the de-icing heating element is arranged in an aft portion of a strut of the air data sensor, and wherein the anti-icing heating element is arranged in a leading edge portion of the strut.

8. The method as recited in claim 7, wherein the anti-icing heating element is also arranged in a pitot probe extending forward from the strut.

9. The method as recited in claim 1, further comprising detecting icing conditions, wherein activating de-icing for the second duration is performed in response to detecting the icing conditions.

10. The method as recited in claim 9, wherein detecting icing conditions includes receiving temperature data from at least one temperature sensor of the air data sensor indicative of a temperature drop.

11. The method as recited in claim 9, wherein detecting icing conditions includes receiving electrical current data from an anti-icing heating element of the air temperature sensor indicative of a temperature drop.

12. The method as recited in claim 9, wherein detecting icing conditions includes receiving ice detection data from at least one dedicated ice detector aboard an aircraft that is separate from the air data sensor indicative of icing conditions.

13. The method as recited in claim 9, further comprising:

detecting cessation of the icing conditions; and deactivating de-icing for a third duration after the second duration in response to detecting the cessation of the icing conditions, while continuing to perform anti-icing during the third duration.

14. A system comprising:

an air data sensor including a controller and machine readable instructions configured to cause the controller to:

perform anti-icing on a forward portion of the air data sensor for a first duration while maintaining de-icing on an aft portion of the air data sensor in a deactivated state; and activate de-icing on the aft portion of the air data sensor for a second duration while also performing anti-icing on the forward portion of the air data sensor.

15. The system as recited in claim 14, wherein performing anti-icing includes activating an anti-icing heating element situated in the forward portion of the air data sensor, wherein activating de-icing includes activating a de-icing heating element situated in the aft portion of the air data sensor, wherein the de-icing heating element is arranged in an aft portion of a strut of the air data sensor, wherein the anti-icing heating element is arranged in a leading edge portion of the strut, and wherein the anti-icing heating element is also arranged in a pitot probe extending forward from the strut.

* * * * *